April 29, 1941.　　　S. M. YOUNG　　　2,239,948
HARROW
Filed May 25, 1940　　　3 Sheets-Sheet 1

Inventor
Stephen M. Young
By Paul O. Pippel
Att'y.

April 29, 1941.　　　　S. M. YOUNG　　　　2,239,948
HARROW
Filed May 25, 1940　　　　3 Sheets-Sheet 3

Inventor
Stephen M Young
By Paul O Pippel
Att'y.

Patented Apr. 29, 1941

2,239,948

UNITED STATES PATENT OFFICE 2,239,948

HARROW

Stephen M. Young, Hamilton, Ontario, Canada, assignor, by mesne assignments, to International Harvester Company, Chicago, Ill., a corporation of New Jersey Application May 25, 1940, Serial No. 337,233

11 Claims. (Cl. 55—83)

This invention relates to a harrow. More specifically it relates to a tandem harrow in which provision is made for proper following of the rear gangs behind the front gangs and for the necessary flexibility required in turning.

There is a two-fold problem present in the construction of a tandem harrow. One is a sufficiently substantial connection of the rear gangs to the front gangs so that the rear gangs trail properly behind the front gangs. The other is the making of this construction sufficiently flexible so that the harrow may be turned easily.

An object of the present invention is the provision of an improved harrow.

Another object is to provide a tandem harrow in which the rear gangs trail properly behind the front gangs.

A further object is the provision of a tandem harrow which is easily turned.

According to the present invention the front gangs of a tandem harrow are connected to the rear frame by means of links which have a slidable connection with the rear frame. The links are connected to one another by means of an equalizing lever mounted on the rear frame. The sliding connection of the links with the rear frame insures the necessary flexibility for turning, and the equalizing lever causes the rear gangs to trail properly behind the front gangs.

Figure 1:
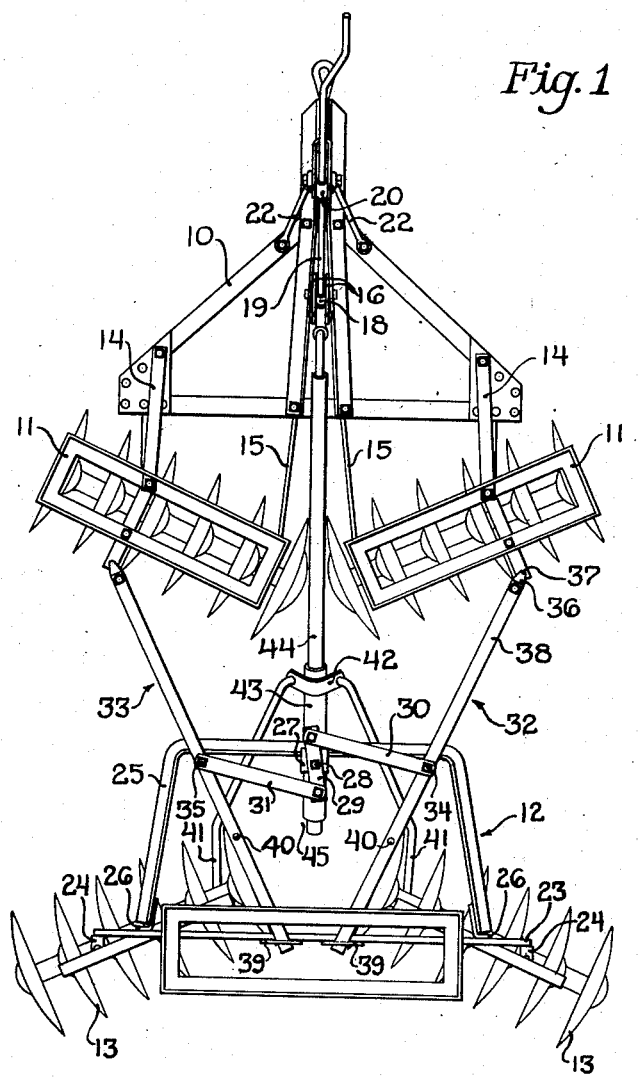
Figure 1 is a plan view of the harrow of the present invention in normal working position.

The harrow of the present invention comprises a front frame 10, front gangs 11, rear frame 12, and rear gangs 13. The front gangs are connected adjacent their outer ends to the front frame by means of links 14. The inner ends of the front gangs 11 are adjustably connected to the front frame 10 by means of links 15 which are connected to the lower end of a lever 16 pivotally mounted at 17 on the front frame 10. The upper portion of the lever 16 carries a nut 18 which is engaged by a threaded crank rod 19 rotatably mounted against axial movement in a collar 20. The collar is carried by a member 21 secured to the front frame 10 and braced by a member 22.

Figure 3:
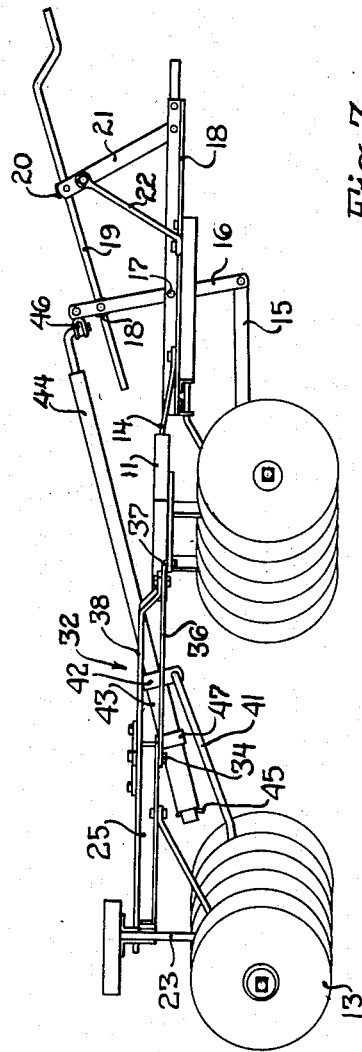
Figure 3 is a side view of the harrow of Figure 1.

The rear frame 12 comprises a transverse member 23 connected at 24 adjacent the outer ends of the rear gangs 13. A U-shaped member 25 in the form of an angle iron extends forwardly from the member 23 and is connected thereto at its ends by pieces 26. At the middle of the base portion of the U-shaped member 25 is a part 27 which provides at 28 a pivotal support for a mid-point of a lever 29. To the ends of the lever are connected links 30 and 31 which are connected in turn to links 32 and 33 by bolts 34 and 35. The links 32 and 33 are formed identically as shown for the link 32 in Figure 3. As illustrated in this figure, the link 32 comprises a lower member 36 connected at 37 adjacent the outer end of the front gang 11 and supported at its rear end under the U-shaped member 25 by means of the bolt 34. The link 32 also includes an upper member 38 secured at its front end adjacent the connection at 37 of the lower member 36 to the front gangs 11. The upper member 38 rests on the U-shaped member 25 and is connected to the lower member 36 by means of the bolt 34. The rear end of the member 38 passes through a slotted element 39 secured to the transverse member 23 of the rear frame 12. The member 38 carries a projection 40 which limits the sliding movement of the member 38 in the slotted part 39.

The inner ends of the rear gangs 13 are connected by means of links 41 to a strap 42 secured to a sleeve 43 slidably mounted on a rod 44. A cotter pin 45 passes through the rear end of the rod 44 and limits the relative movement of the sleeve 43 rearwardly of the rod 44. The rod 44 has its forward end pivotally connected to a member 46 secured to the upper end of the lever 16. The sleeve 43 is slidably supported in a strap 47 secured to the under side of the U-shaped member 25.

Angling of the gangs of the harrow from transport position to working position is accomplished by rotation of the crank 19. Rotation of this crank causes a longitudinal movement of the nut 18 along the crank and a consequent angular movement of the lever 16. Such movement of the lever causes movement of the links 15 and accordingly a movement of the front gangs 11 and also a lengthwise movement of the rod 44 which causes a similar movement of the sleeve 43, the link 41, and the rear gangs 13. When the gangs are to be straightened, the crank 19 is rotated so that the rod 44 moves rearwardly. The rod 44 may slide rearwardly in the sleeve 43, and no rearward movement of the sleeve is effected. Consequently, straightening of the rear gangs 13 does not take place until the harrow is moved forwardly.

Figure 1 shows the harrow in normal working position with the gangs angled. In this position the front gangs may be in the same horizontal plane or the inner ends may be lowered so that a V-groove is formed by the harrow. In any event, it is very important that the rear gangs trail properly behind the front gangs so that the disks of the rear gangs will not run in the grooves formed by the disks of the front gangs. A proper trailing by the rear gangs is assured through the links 32 and 33 and the rear frame 12. The equalizing lever 29 with its link connections 30 and 31 to the links 32 and 33 assures that these links keep the same spacing from a mid-point of the base of the U-shaped member 25. If, for example, there is a tendency for the left rear gang to move toward the left, the link 33 also tends to move in this direction and to pull the link 31 in this direction, and a turning of the equalizing lever 29 results and with it a movement of the link 30 to the right. This action moves the link 32 to the right and with it the right rear gang 13. Thus, any pull by one rear gang in one direction is automatically opposed by a corresponding pull in the other direction by the other rear gang, and the rear gangs are kept in proper trailing position.

Figure 2:
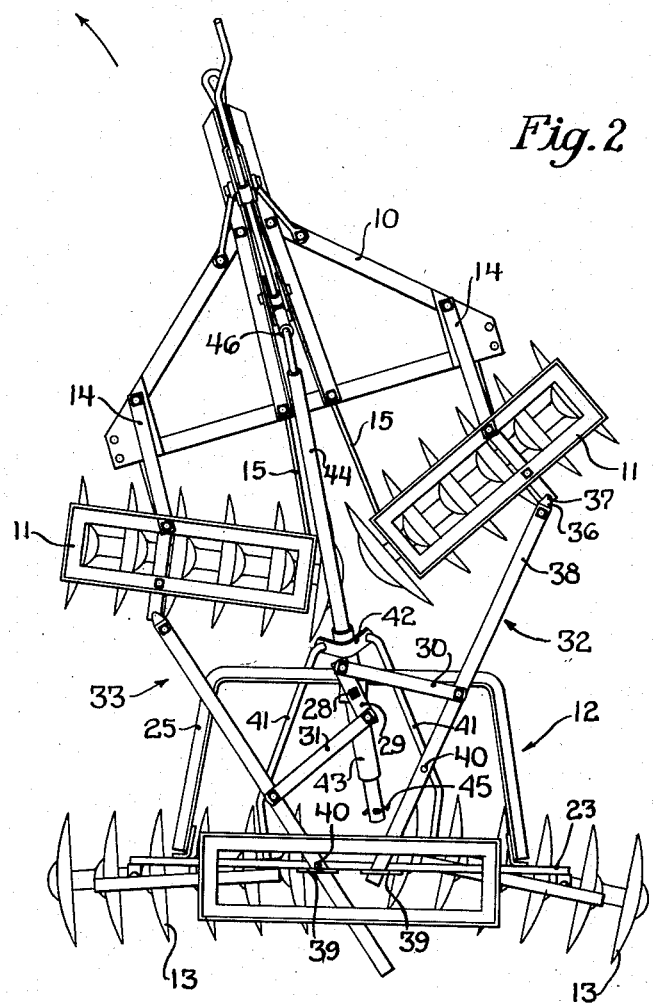
Figure 2 is a plan view of the harrow while being turned to the left.

Figure 2 shows the harrow in the process of turning to the left as indicated by the arrow. As will be observed from comparison of Figures 1 and 2, the right side of the front frame 10 is moved and consequently pulls the link 32 forward. The pull of the link 32 on the bolt 34 causes a pulling forward of the U-shaped member 25 of the rear frame 12. The rear gangs 13 tend to go out of angle as illustrated in Figure 2 since a forward pull is exerted on the outer ends of the rear gang through the pull of the U-shaped member 25 on the transverse member 23. The forward end of the rod connected to the part 46 on the lever 16 does not move as far forward in the turn as the right end of the front frame 10, and, consequently, there is relative forward movement of the U-shaped member 25 with respect to the rod 44. The rear gangs tend to straighten, the inner ends thereof straightening in relatively the same position. Thus, the sleeve 43 stays in the same position although it moves rearwardly with respect to the U-shaped member 25. Ground conditions may be such that in the turn the rear gangs may not straighten as much as shown in Figure 2. In this event, the inner ends of the rear gangs will tend to move forward at about the same rate as the outer ends, and, therefore, the sleeve 43 will tend to retain about the same position with respect to the U-shaped member 25. Consequently, the rod 44 must move with respect to the sleeve 43. This movement is permitted by the sliding connection of the rod and sleeve. The angle of the front frame 10 with respect to the rear frame 12 in turning is limited by the stops 40 on the links 32 and 33 which abut the slotted members 39 carried on the transverse member 23 of the rear frame. When the turn is completed, the harrow is pulled straight and the links 32 and 33 exert equal forces upon the U-shaped member 25 of the rear frame to the bolts 34 and 35. The rear gangs are automatically brought into alinement behind the front gangs by the action of the equalizing lever 29. This lever centralizes the links 32 and 33 with respect to the U-shaped member 25 and causes the bolts 34 and 35 to contact the U-shaped member at equal distances from the center of the base of the U-shaped member. Consequently, the rear gangs trail directly behind the front gangs.

It will be apparent from the foregoing description that a novel harrow construction has been provided in which there is provision for correct trailing of the rear gangs behind the front gangs and yet sufficient flexibility is provided for easy turning.

The invention is to be limited only within the scope of the appended claims.

What is claimed is:

1. A harrow comprising a front unit composed of a frame and a pair of gangs, a rear unit composed of a frame and a pair of gangs, a pair of spaced links, means connecting the links at one end with one unit, means slidably connecting the links at their other end with the other unit for providing a relative movement of the links toward the said other frame and a relative movement of the links away from the said other frame only up to a certain point, and means connecting the links and one unit for causing the rear unit to trail directly behind the front unit.

2. A harrow comprising a front unit composed of a frame and a pair of gangs, a rear unit composed of a frame and a pair of gangs, a pair of spaced links, means attaching one end of one link and one unit, means slidably connecting the other end of the one link and other unit for providing a relative movement of the link toward the said other unit and relative movement of the link away from the said other unit only up to a certain point, means attaching one end of the other link and one unit, means slidably connecting the other end of the said other link and the other unit for providing a relative movement of the said other link toward the last-mentioned other unit and relative movement of the said other link away from the last-mentioned other unit only up to a certain point, and means connecting the links and one unit for causing the rear unit to trail directly behind the front unit.

3. A harrow comprising a front unit composed of a frame and a pair of gangs, a rear unit composed of a frame and a pair of gangs, a pair of spaced links, means attaching one end of the links to the front unit, means slidably connecting the other end of the links and the rear unit for providing a relative movement of the links toward the rear unit and a relative movement of the links away from the rear unit up to a certain point, and means connecting the rear unit and the links for causing the rear unit to trail directly behind the front unit.

4. A harrow comprising a front unit composed of a frame and a pair of gangs, a rear unit composed of a frame and a pair of gangs, a pair of spaced links, means connecting one end of the links and one unit, means slidably connecting the other end of the links and the other unit for providing a relative movement of the links toward the said other frame and a relative movement of the links away from the said other frame only up to a certain point, means attaching one end of the links adjacent the ends of the front unit, means slidably connecting the other end of the links at a mid-portion of the rear unit for providing a movement of the links toward the rear unit and a movement of the links away from the rear unit up to a certain point, and means connecting the rear unit and the links for causing the rear unit to trail directly behind the front unit.

5. A harrow comprising a pair of front gangs, a pair of rear gangs, a front frame connected to the outer ends of the front gangs, a rear frame connected to the rear gangs and having a forward extension toward the front gangs, links attached at one end to the outer ends of the front gangs and slidably connected at the other end with a central portion of the rear frame at the rear and movably connected with the extension of the rear frame so as to be allowed backward movement but no forward movement beyond a certain point, and means connecting the links and a mid-point of the extension for keeping the links equally spaced from the mid-point.

6. A harrow comprising a pair of front gangs, a pair of rear gangs, a front frame connected to the outer ends of the front gangs, a rear frame connected to the rear gangs and having a forward extension toward the front gangs, links attached at one end to the outer ends of the front gangs and slidably connected at the other end with a central portion of the rear frame at the rear and movably connected with the extension of the rear frame so as to be allowed backward movement but no forward movement beyond certain points, a lever mounted between its ends on a mid-point at the front of the extension of the rear frame, and links connecting the ends of the lever and the aforementioned links.

7. A harrow comprising a front unit comprising a pair of front gangs and a front frame connected thereto, a rear unit comprising a pair of rear gangs, a rear frame, and a forward extension from the rear frame, links attached at one end to the outer ends of the front unit and slidably connected at the other end to a central portion of the rear frame and being slidably supported at a mid-point on the extension, means projecting from the links immediately adjacent their points of support on the extension for limiting the forward movement of the links with respect to the extension, and means connecting the links and the extension for causing the rear unit to trail directly behind the front unit.

8. A harrow comprising a front unit comprising a pair of front gangs and a front frame connected thereto, a rear unit comprising a pair of rear gangs, a rear frame, and a forward extension from the rear frame, links attached at one end to the outer ends of the front unit and slidably connected at the other end of a central portion of the rear frame and being slidably supported at a mid-point on the extension, pins projecting from the links immediately adjacent their points of support on the extension for limiting the forward movement of the links with respect to the extension, a lever pivoted between its ends on the extension, and links connected to the ends of the lever and to the aforementioned links by means of the pins.

9. A harrow comprising a pair of front gangs, a pair of rear gangs, a front frame connected to the outer ends of the front gangs, a rear frame connected to the rear gangs and having a forward extension toward the front gangs, links attached at one end to the outer ends of the front gangs and slidably connected at the other end with a central portion of the rear frame at the rear, and slidably supported on top of the extension, elements attached to the links at their attachment to the front gangs and extending in spaced parallel relation to the links under the extension, pins connecting the links and the elements immediately behind the extensions so as to cause the links and elements to embrace the extension and to permit the links a limited forward movement with respect to the extension, a lever pivoted between its ends on the extension, links connected to the ends of the lever and to the aforementioned links by means of the pins.

10. A harrow comprising a pair of front gangs, a pair of rear gangs, a front frame connected to the outer ends of the front gangs, a rear frame connected to the rear gangs and having a forward extension toward the front gangs, links attached at one end to the outer ends of the front gangs and slidably connected at the other end with a central portion of the rear frame at the rear and slidably supported on top of the extension, elements attached to the links at their attachment to the front gangs and extending in spaced parallel relation to the links under the extension, pins connecting the links and the elements immediately behind the extension so as to cause the links and elements to embrace the extension and to permit the links a limited forward movement with respect to the extension, a lever pivoted between its ends on the extension, links connected to the ends of the lever and to the aforementioned links by means of the pins, and means mounted on the front frame and connected to the inner ends of the front gangs and the rear gangs for adjusting the gangs.

11. A harrow comprising a front unit composed of a frame and a pair of gangs, a rear unit composed of a frame and a pair of gangs, a pair of spaced links, means connecting one end of the links and the front unit, means slidably connecting the other end of the links and the rear unit for providing a relative movement of the links toward the frame of the rear unit and a relative movement of the links away from the frame of the rear unit only up to a certain point, means connecting the links and one unit for causing the rear unit to travel directly behind the front unit, and means for angling the gangs including a first part connected with the front frame and a second part connected with the inner ends of the rear gangs and connected with the first member so as to be allowed a movement toward the front frame independently of the first member and a movement away from the frame independently of the first member only to a certain point.

STEPHEN M. YOUNG.